US009287538B2

(12) United States Patent
Miyawaki et al.

(10) Patent No.: US 9,287,538 B2
(45) Date of Patent: Mar. 15, 2016

(54) ELECTRIC STORAGE APPARATUS AND ELECTRIC STORAGE APPARATUS UNIT

(71) Applicants: GS Yuasa International Ltd., Kyoto-shi (JP); KOBELCO CONSTRUCTION MACHINERY CO., LTD., Hiroshima-shi (JP)

(72) Inventors: Yasutaka Miyawaki, Kyoto (JP); Hiroshi Yamashiro, Kyoto (JP); Hiroaki Tao, Hiroshima (JP); Yoshihiro Nakamura, Hiroshima (JP); Yusuke Sawada, Hiroshima (JP)

(73) Assignees: GS YUASA INTERNATIONAL LTD., Kyoto-Shi, Kyoto (JP); KOBELCO CONSTRUCTION MACHINERY CO., LTD., Hiroshima-Shi, Hiroshima (JP)

( * ) Notice: Subject to any disclaimer, the term of this patent is extended or adjusted under 35 U.S.C. 154(b) by 78 days.

(21) Appl. No.: 14/218,714

(22) Filed: Mar. 18, 2014

(65) Prior Publication Data

US 2014/0287291 A1    Sep. 25, 2014

(30) Foreign Application Priority Data

Mar. 19, 2013   (JP) ................................. 2013-056852

(51) Int. Cl.
*H01M 2/10* (2006.01)
*H01M 10/613* (2014.01)
*H01M 10/6554* (2014.01)

(52) U.S. Cl.
CPC ........ *H01M 2/1077* (2013.01); *H01M 10/5004* (2013.01); *H01M 10/613* (2015.04); *H01M 10/6554* (2015.04); *H01M 2220/20* (2013.01)

(58) Field of Classification Search
CPC .......... H01M 2/1077; H01M 10/5004; H01M 10/613; H01M 10/6554; H01M 2220/20
See application file for complete search history.

(56) References Cited

U.S. PATENT DOCUMENTS

| | | | |
|---|---|---|---|
| 4,756,978 A | | 7/1988 | Nitcher et al. |
| 2002/0179552 A1* | | 12/2002 | Marraffa ...................... 211/49.1 |
| 2009/0111010 A1* | | 4/2009 | Okada et al. .................. 429/120 |
| 2009/0197154 A1 | | 8/2009 | Takasaki et al. |
| 2011/0117419 A1 | | 5/2011 | Lee et al. |
| 2011/0135992 A1 | | 6/2011 | Kim et al. |
| 2013/0202937 A1 | | 8/2013 | Kim et al. |

FOREIGN PATENT DOCUMENTS

| | | |
|---|---|---|
| EP | 1 032 058 A1 | 8/2000 |
| JP | 2003-068259 A | 3/2003 |
| JP | 2001-229901 A | 8/2004 |
| JP | 2011-108652 A | 6/2011 |
| JP | 2011-119222 A | 6/2011 |
| JP | 2012-094456 A | 5/2012 |
| JP | 2013-122820 A | 6/2013 |
| WO | WO 2011/106431 A2 | 9/2011 |

OTHER PUBLICATIONS

European Search Report dated Jun. 25, 2014.

* cited by examiner

*Primary Examiner* — Carlos Barcena
(74) *Attorney, Agent, or Firm* — McGinn IP Law Group, PLLC.

(57) ABSTRACT

An electric storage apparatus in which a first projecting portion projecting on one side and a second projecting portion projecting on the opposite side of the one side are formed at different positions in a direction orthogonal to a direction in which the first and second projecting portions project.

20 Claims, 7 Drawing Sheets

_US 9,287,538 B2_

ELECTRIC STORAGE APPARATUS AND ELECTRIC STORAGE APPARATUS UNIT

CROSS-REFERENCE TO RELATED APPLICATION

This application claims priority to Japanese Patent Application No. 2013-056852, the disclosure of which is incorporated herein by reference in its entirety.

FIELD

The present invention relates to an electric storage apparatus in which at least one electric storage device is packaged, and to an electric storage apparatus unit in which at least two such electric storage apparatuses are aligned.

BACKGROUND

Hybrid machines or electrically driven machines, being widely spread in place of internal combustion engines, have an electric storage apparatus unit mounted thereon as a power source for a motor. Such an electric storage apparatus unit is provided with electric storage apparatuses in which rechargeable electric storage devices, such as battery cells (lithium ion battery cells, nickel hydrogen battery cells, or the like) and capacitors (electric double layer capacitors, or the like), are packaged in a number corresponding to specification requirements of machines.

For example, a battery pack (electric storage apparatus unit) disclosed in JP 2011-108652 A has a configuration in which battery modules 100 (electric storage apparatuses) each composed of a plurality of unit battery cells 110 (electric storage devices), an upper frame 120, a lower frame 130, side frames 140, and end plates 150, as shown in FIG. 1 of JP 2011-108652 A, are aligned in the up-down direction and width direction, as shown in FIG. 6 thereof.

Further, a power source apparatus (electric storage apparatus unit) disclosed in JP 2012-094456 A has a configuration in which battery stacks 50 (electric storage apparatuses) each composed of a plurality of rectangular battery cells 1 (electric storage devices), binding bars 11, and end plates 4, as shown in FIG. 3 of JP 2012-94456 A, are aligned in the longitudinal direction and lateral direction on a base plate 6, as shown in FIG. 3 and FIG. 2 thereof.

Meanwhile, such an electric storage apparatus unit is installed in a limited space of a machine and thus is required to eliminate waste spaces as much as possible, so as to be downsized.

The battery pack (electric storage apparatus unit) disclosed in JP 2011-108652 A, as seen from such a viewpoint, has waste spaces between adjacent battery modules 100 (electric storage apparatuses) because, when the battery modules 100 (electric storage apparatuses) are transversely aligned, they are required to be spaced from each other so as to prevent the heads of bolts for fixing the side frames 140 to the end plates 150 from abutting each other.

Further, the power source apparatus (electric storage apparatus unit) disclosed in JP 2012-094456 A has waste spaces between adjacent battery stacks 50 (electric storage apparatuses) because, when the battery stacks 50 (electric storage apparatuses) are transversely aligned, they are required to be spaced from each other so as to prevent fixing pieces 31 for fixing the binding bars 11 to the base plate 6 from abutting each other.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an electric storage apparatus and an electric storage apparatus unit that are capable of enhancing the space efficiency when a plurality of electric storage apparatuses are arranged adjacent to each other.

An electric storage apparatus according to an aspect of the present invention includes: at least one electric storage device; and a holding member holding the electric storage device, wherein the holding member includes a first projecting portion projecting on one side and a second projecting portion projecting on the opposite side of the one side, and the first projecting portion and the second projecting portion are formed at different positions from each other in a direction orthogonal to a direction in which the first and second projecting portions project.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
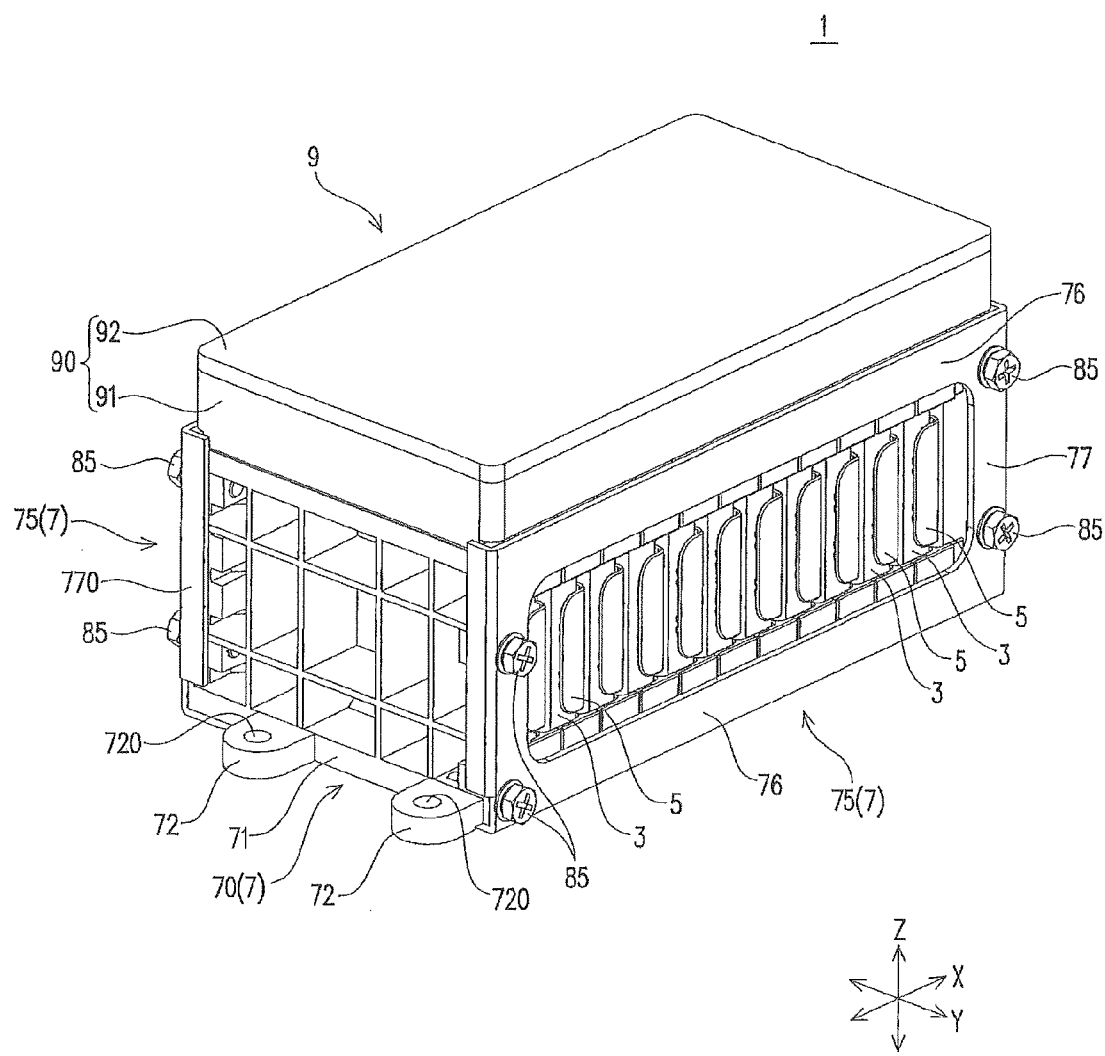
FIG. 1 is a perspective view of a battery module as one embodiment of an electric storage apparatus according to the present invention.
Figure 2:
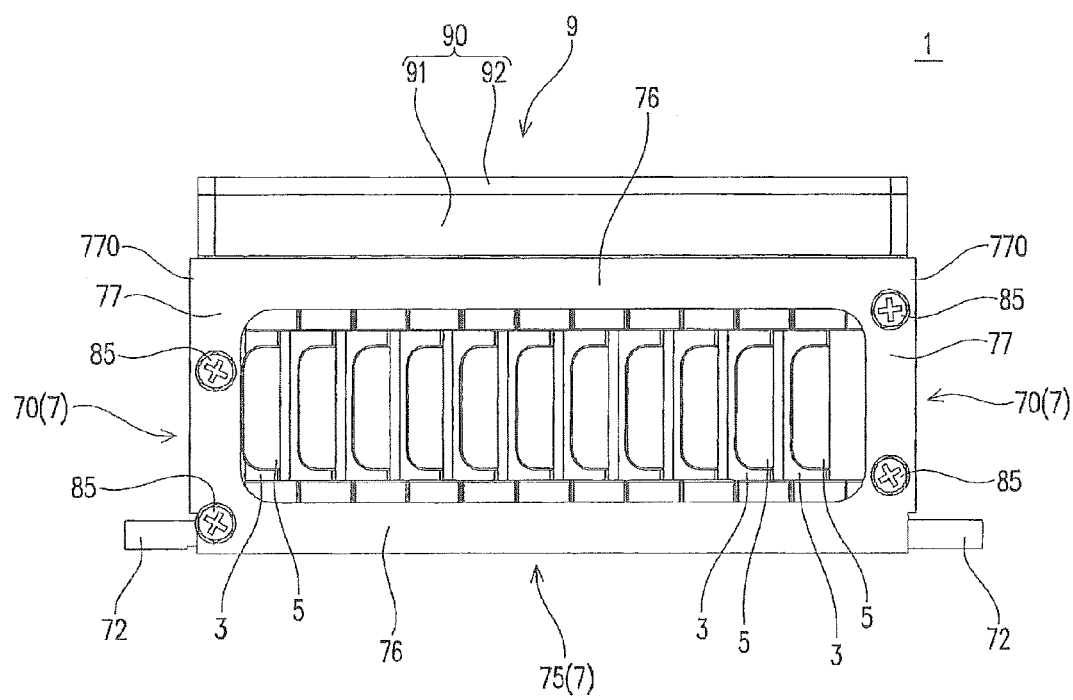
FIG. 2 is a front view of the same battery module.
Figure 2:
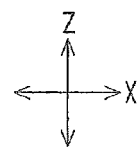
Figure 3:
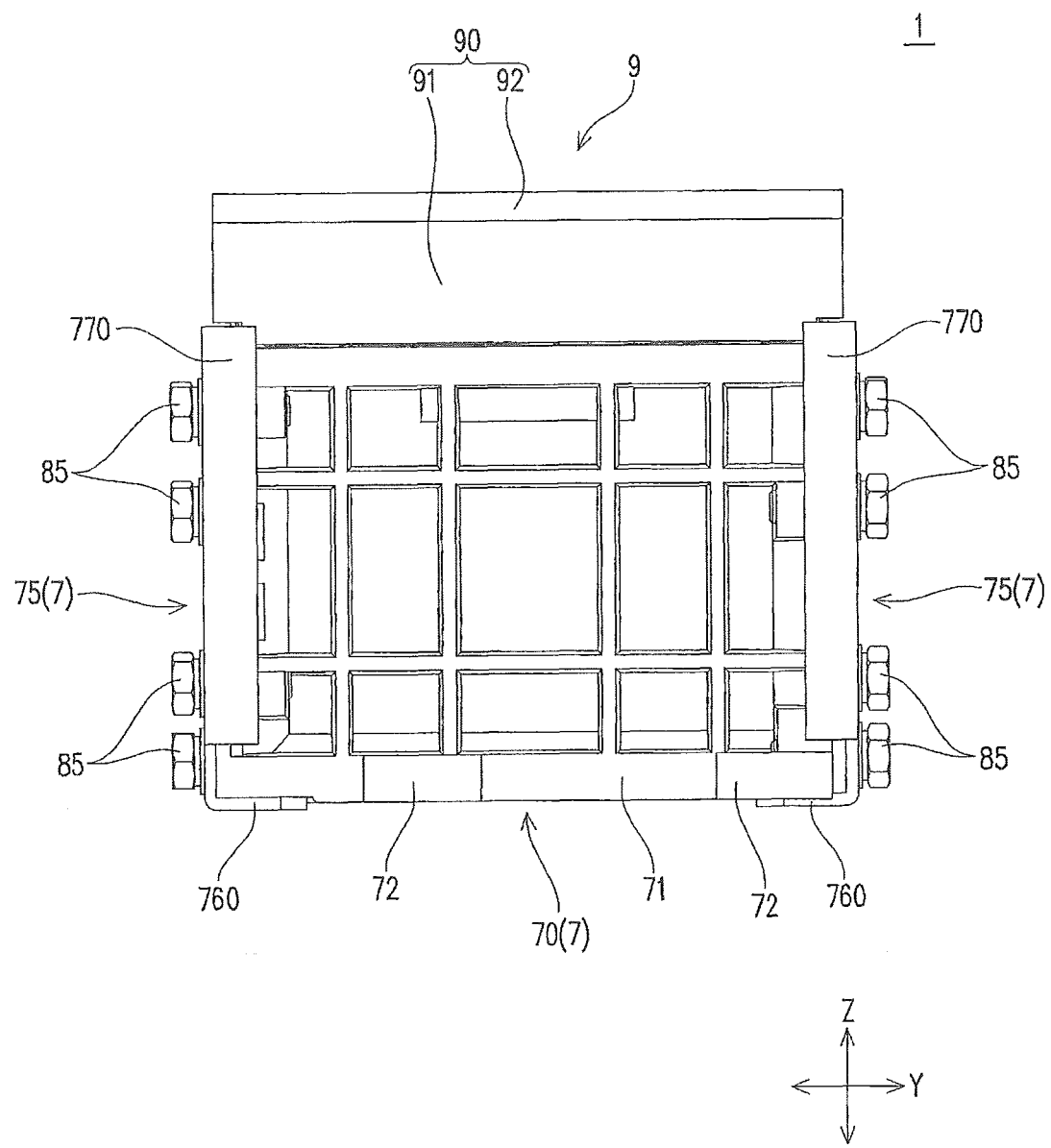
FIG. 3 is a side view of the same battery module.
Figure 4:
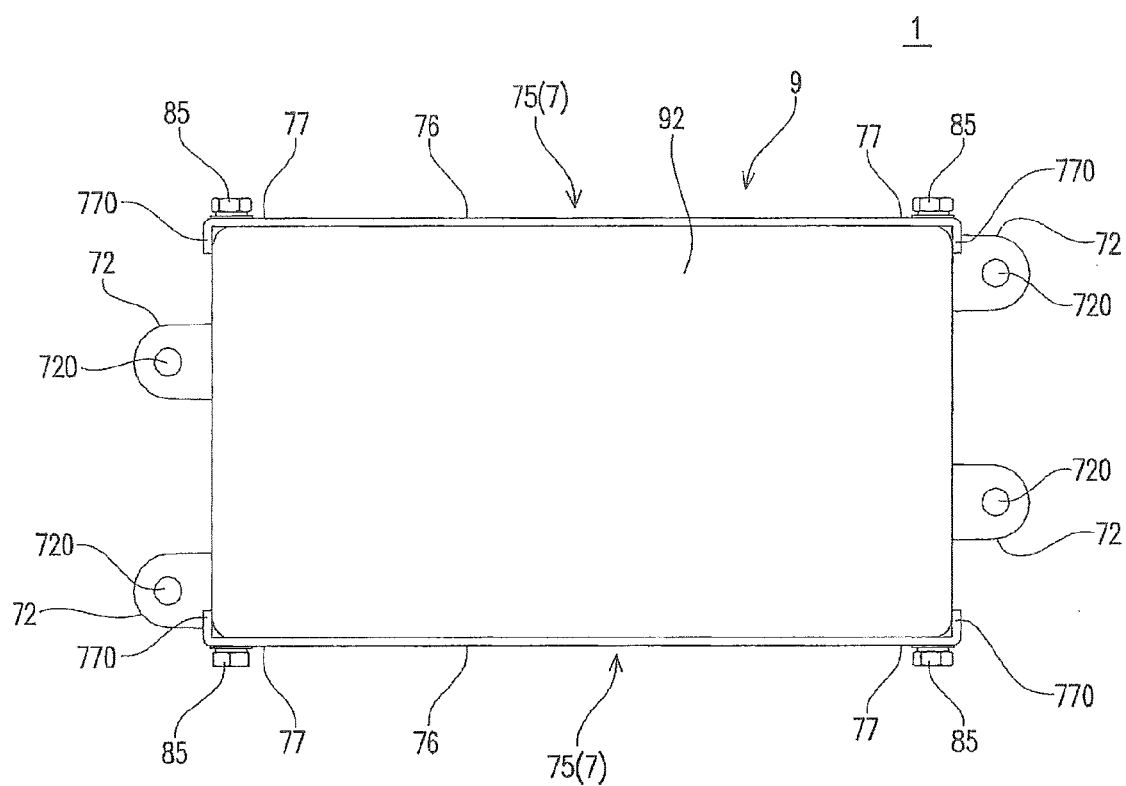
FIG. 4 is a plan view of the same battery module.
Figure 5:
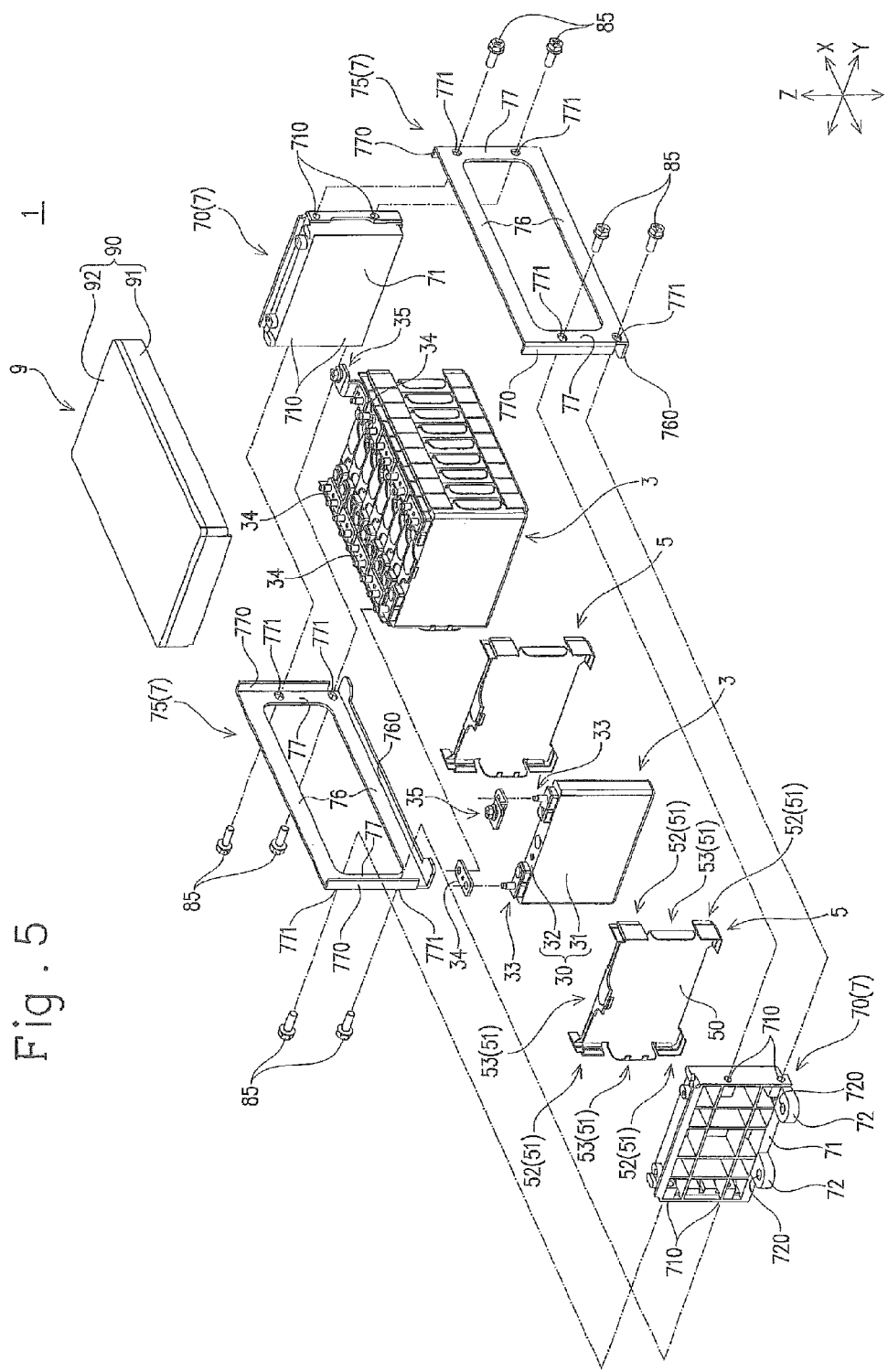
FIG. 5 is an exploded perspective view of the same battery module.

An electric storage apparatus according to an aspect of the present invention includes: at least one electric storage device; and a holding member holding the electric storage device, wherein the holding member includes a first projecting portion projecting on one side and a second projecting portion projecting on the opposite side of the one side, and the first projecting portion and the second projecting portion are formed at different positions from each other in a direction orthogonal to a direction in which the first and second projecting portions project.

According to such a configuration, when at least two electric storage apparatuses are aligned in the direction in which the first and second projecting portions project, a first projecting portion of one of adjacent electric storage apparatuses and a second projecting portion of the other thereof do not interfere with each other. Therefore, the adjacent electric storage apparatuses can be arranged as closely as possible.

According to one aspect, the electric storage apparatus of the present invention may have a configuration in which: the holding member includes a pair of members arranged respectively on both sides of the electric storage device; the first projecting portion is provided in one of the pair of members, and the second projecting portion is provided in the other of the members; and the pair of members are the same two members, with the one member and the other member having an inverse relationship to each other.

According to such a configuration, when at least two electric storage apparatuses are aligned in a direction in which the pair of members are arranged, a first projecting portion in one member of one of adjacent electric storage apparatuses and a second projecting portion in the other member of the other of the electric storage apparatuses do not interfere with each other. Therefore, the adjacent electric storage apparatuses can be arranged as closely as possible.

Further, according to another aspect, the electric storage apparatus of the present invention may have a configuration in which the projecting portions are leg portions of the holding member.

According to such a configuration, the leg portions that support the electric storage apparatus are provided, and the leg portions serve as the projecting portions, undesirably. However, the leg portions are arranged to be shifted so as not to interfere with each other when the electric storage apparatuses are aligned. Therefore, adjacent electric storage apparatuses can be arranged as closely as possible.

Further, according to another aspect, the electric storage apparatus of the present invention may have a configuration in which the holding member is composed of a plurality of members, and the projecting portions are parts of fastening members configured to fasten the members to each other.

According to such a configuration, the fastening members are used for assembling the holding member, and parts of the fastening members serve as the projecting portions, undesirably. However, the parts of the fastening members are arranged to be shifted so as not to interfere with each other when the electric storage apparatuses are aligned. Therefore, adjacent electric storage apparatuses can be arranged as closely as possible.

According to another aspect, the electric storage apparatus of the present invention may have a configuration further including a cooling plate, on which the electric storage apparatus is mounted, configured to cool the electric storage device by being in contact with the electric storage apparatus.

According to such a configuration, the plurality of electric storage apparatuses can be closely arranged, and thus the electric storage apparatuses can be uniformly cooled without unevenness.

Further, an electric storage apparatus unit according to another aspect of the present invention includes: at least two aligned electric storage apparatuses each including at least one electric storage device and a holding member configured to hold the electric storage device, wherein the holding member of each of adjacent electric storage apparatuses includes a projecting portion projecting between the adjacent electric storage apparatuses, and the projecting portion of the holding member of one of the adjacent electric storage apparatuses and the projecting portion of the holding member of the other of the electric storage apparatuses are formed at different positions in a direction orthogonal to a direction in which the adjacent electric storage apparatuses are aligned.

According to such a configuration, the projecting portions do not interfere with each other. Therefore, the adjacent electric storage apparatuses can be arranged as closely as possible.

The aspects of the present invention as described above can exert an excellent effect of enhancing the space efficiency when the plurality of electric storage apparatuses are arranged adjacent to each other.

Hereinafter, a battery module as one embodiment of the electric storage apparatus according to the present invention is described with reference to the drawings.

As shown in FIG. 1 to FIG. 5, a battery module 1 includes a plurality of battery cells 3 aligned in a first direction, a plurality of spacers 5 respectively arranged between adjacent battery cells 3 and on both sides in the first direction of the plurality of battery cells 3, a frame 7 as a holding member that holds the plurality of battery cells 3 and the plurality of spacers 5 so as to package them, and a cell monitoring circuit (CMU: Cell Monitor Unit) module 9 that monitors the plurality of battery cells 3 on a one-by-one basis of battery cells 3 for at least one of their voltage, current, and temperature.

In the following description, the first direction is referred to as an X direction (the direction of the X axis among orthogonal axes shown in the figures), and a second direction orthogonal to the first direction is referred to as a Y direction (the direction of the Y axis among orthogonal axes shown in the figures), and a third direction orthogonal to the first direction and the second direction is referred to as a Z direction (the direction of the Z axis among orthogonal axes shown in the figures), for convenience of description. In the figures, symbols X, Y, and Z are respectively indicated on one side of the X direction, the Y direction, and the Z direction. In the case where the Z direction is set in the vertical direction, the Z direction is the up-down direction, the Y direction is the left-right direction, and the X direction is the front-rear direction, in the figures.

The battery cells 3 each include a case 30 composed of a case body 31 having an opening and a cover plate 32 configured to close and seal the opening of the case body 31. The case 30 houses an electrode assembly (not shown in the figure) including a positive electrode plate and a negative electrode plate insulated from each other. The battery cell 3 is a rectangular battery cell flattened in the X direction.

The battery cell 3 includes a pair of positive and negative electrode terminals 33. Adjacent battery cells 3 are arranged so as to have opposite polarities to each other, and a bus bar 34 is attached to the electrode terminals 33 of the adjacent battery cells 3. From above them, nuts (not shown) are threadedly engaged to the electrode terminals 33. In this way, the plurality of battery cells 3 are electrically connected to one another, thereby forming one battery. A positive electrode external terminal 35 is attached to one electrode terminal (positive electrode terminal) 33 of one battery cell 3 (hereinafter, referred to as a "battery cell on one end") of two of the plurality of battery cells 3 that are located on both ends in the X direction, and a negative electrode external terminal 35 is attached to one electrode terminal (negative electrode terminal) 33 of the other of the two of the battery cells 3 (hereinafter, referred to as a "battery cell on the other end").

The spacers 5 are each made of a synthetic resin with insulating properties. The spacer 5 includes a spacer body 50 and a holding portion 51 extending from the spacer body 50 in the X direction and configured to hold the outer peripheral edges of the battery cell 3 that faces the spacer body 50 in the X direction. The spacer body 50 is formed into a rectangular shape corresponding to the rectangular shape, as seen in the X direction, of the case 30 of the battery cell 3. The holding portion 51 includes corner holding portions 52 formed respectively at four corners of the spacer body 50 and inter-corner holding portions 53 formed respectively at the center of three sides of the spacer body 50.

The battery module according to this embodiment employs, as a method for cooling the battery cells 3, a so-called water-cooling system in which the battery cells 3 are cooled by being in contact with a cooling plate (heatsink) in which a cooling medium such as water circulates (via a pipe), but not a so-called air-cooling system in which the battery cells 3 are cooled by the air circulating through gaps formed between the battery cells 3. An air-cooled spacer uses a spacer body, for example, having a square-wave cross section in order to secure an air channel. However, a water-cooled spacer is free from such a requirement. Therefore, this embodiment employs the spacer body 50 in the form of a flat plate. Thus, the spacer 5 is arranged between adjacent battery cells 3 such that one surface in the X direction of the case 30 of one of the adjacent battery cells 3 abuts one surface of the spacer body 50, and one surface in the X direction of the case 30 of the other of the adjacent battery cells 3 abuts the other surface of the spacer body 50.

The frame 7 includes a pair of end members 70 (so-called end plates) arranged respectively on both sides in the X direction of the plurality of battery cells 3 so as to sandwich the plurality of battery cells 3 and the plurality of spacers 5 in the X direction, and coupling members 75 coupling the pair of end members 70 to each other so as to tighten the plurality of battery cells 3 and the plurality of spacers 5 into one.

The end members 70, for example, are each made of a metal such as aluminum and formed by casting. The end member 70 includes an end member body 71 and a leg portion 72 projecting outwardly from a lower part of the end member body 71 in the X direction. The end member body 71 is formed into a rectangular shape corresponding to the rectangular shape, as seen in the X direction, of the case 30 of the battery cell 3, in the same manner as the spacer body 50. The end member body 71 is composed of a rectangular frame portion and ribs in the form of a lattice formed within the frame portion. The end member body 71 is light in weight while having a moderate thickness in the X direction, thus having rigidity.

An internal thread 710 is formed along the Y direction on a lateral part of the end member body 71, into which a threaded portion of a bolt (fastener) 85, which will be described below, is screwed. A pair of internal threads 710 are provided in the Z direction at an interval from each other, on each of one lateral part and the other lateral part in the Y direction of the end member body 71 (hereinafter, referred to simply as "one lateral part" and "the other lateral part").

The pair of internal threads 710 in the one lateral part are formed at asymmetrical positions to each other with respect to the center line in the Z direction of the end member body 71. That is, one of the internal threads 710 is formed on one end side in the Z direction of the one lateral part, and the other of the internal threads 710 is formed at a position on the other end side thereof that is closer to the center in the Z direction of the one lateral part. More specifically, the one internal thread 710 is arranged on one end side in the Z direction of the one lateral part, and the other internal thread 710 is arranged in the one lateral part so that an interval larger than the width dimension in the Z direction of the head of the bolt 85 is formed between itself and the one internal thread 710, and an interval larger than the width dimension in the Z direction of the head of the bolt 85 is formed between itself and the other end in the Z direction of the one lateral part.

Further, the pair of internal threads 710 in the other lateral part are formed at asymmetrical positions to each other with respect to the center line in the Z direction of the end member body 71. That is, one of the internal threads 710 is formed on the other end side in the Z direction of the other lateral part, and the other of the internal threads 710 is formed at a position on one end side thereof that is closer to the center in the Z direction of the other lateral part. More specifically, one internal thread 710 is arranged on the other end side in the Z direction of the other lateral part, and the other internal thread 710 is arranged in the other lateral part so that an interval larger than the width dimension in the Z direction of the head of the bolt 85 is formed between itself and the one internal thread 710, and an interval larger than the width dimension in the Z direction of the head of the bolt 85 is formed between itself and the one end in the Z direction of the other lateral part.

Further, the pair of internal threads 710 in the one lateral part and the pair of internal threads 710 in the other lateral part are formed at symmetrical positions to each other with respect to the center point in the Y direction and the Z direction of the end member body 71.

The leg portion 72 is formed integrally with the end member body 71, while having a moderate thickness so as to have a sufficient strength against falling in the X direction and the Y direction in a state of being attached to a base plate A by a bolt (fastener) 87, which will be described below. The leg portion 72 has a through hole 720 formed along the Z direction for allowing the threaded portion of the bolt 87 to pass therethrough. The distal end of the leg portion 72 is formed into a semiarcuate shape. A pair of leg portions 72 are provided in the Y direction at an interval from each other.

The pair of leg portions 72 are formed at asymmetrical positions to each other with respect to the center line in the Y direction of the end member body 71. That is, one of the leg portions 72 is formed on one end side in the Y direction of the lower part of the end member body 71, and the other of the leg portions 72 is formed at a position on the other end side thereof that is closer to the center in the Y direction of the lower part of the end member body 71. More specifically, one leg portion 72 is arranged on one end side in the Y direction of the lower part of the end member body 71, and the other leg portion 72 is arranged so that an interval larger than the width dimension in the Y direction of the leg portion 72 is formed between itself and the one leg portion 72, and an interval larger than the width dimension in the Y direction of the leg portion 72 is formed between itself and the other end in the Y direction of the lower part of the end member body 71.

The same two end members 70 are used as the pair of end members 70 in this embodiment. That is, in this embodiment, the same two end members 70 aligned in the same direction are used with one of the two end members 70 being turned over 180 degree (rotated about the Z axis) so that their inner surfaces face each other.

It should be noted that the spacers 5 arranged between the end members 70 and the battery cells 3 are the same as the spacers 5 arranged between adjacent battery cells 3. Accordingly, the spacers 5 arranged between the end members 70 and the battery cells 3 are each arranged so that a surface in the X direction of the case 30 of the battery cell 3 abuts one surface of the spacer body 50, and the inner surface in the X direction of the end member 70 abuts the other surface of the spacer body 50.

A pair of the coupling members 75 are provided respectively on both sides in the Y direction of the plurality of battery cells 3. That is, one of the coupling members 75 is arranged facing the plurality of battery cells 3 on one side in the Y direction, and the other of the coupling members 75 is arranged facing the plurality of battery cells 3 on the other side in the Y direction.

The coupling members 75 each include a pair of transverse beams 76 extending along the X direction in parallel with an interval to each other, and a pair of longitudinal beams 77 respectively coupling one end portions to each other and the other end portions to each other in the X direction of the pair of transverse beams 76. The coupling member 75 as a whole is in the form of a rectangular frame. One of the pair of transverse beams 76 includes a folded portion 760 extending around the bottom portions of the plurality of battery cells 3. The pair of longitudinal beams 77 include folded portions 770 respectively extending around the surfaces at one end and the other end in the X direction of the battery cells 3. These folded portions 760 and 770 increase the rigidity of the pair of coupling members 75, in addition to which the folded portion 760 restrains the plurality of battery cells 3 and the plurality of spacers 5 in the Z direction, the pair of folded portions 770 restrain them in the X direction, and the pair of transverse beams 76 and the pair of longitudinal beams 77 restrain them in the Y direction. Further, the coupling member 75 is formed of the pair of transverse beams 76 and the pair of longitudinal beams 77 so as to have a frame shape, so that its cross-sectional moment particularly in the X direction is improved, thereby having a significantly increased rigidity in the stacking direction of the plurality of battery cells 3.

A through hole 771 which allows the threaded portion of the bolt 85 to pass therethrough is formed in the Y direction in each of the pair of longitudinal beams 77 of the coupling member 75. A pair of through holes 771 are provided at an interval in the Z direction in each of one end portion and the other end portion in the X direction of the coupling member 75 (hereinafter, referred to simply as "one end portion" and "the other end portion", respectively).

The pair of through holes 771 in the one end portion are formed at asymmetrical positions to each other with respect to the center line in the Z direction of the coupling member 75. That is, one of the through holes 771 is formed on one end side in the Z direction of the one end portion, and the other of the through holes 771 is formed at a position on the other end side thereof that is closer to the center in the Z direction of the one end portion. More specifically, the one through hole 771 is arranged on one end side in the Z direction of the one end portion, and the other through hole 771 is arranged in the one end portion so that an interval larger than the width dimension in the Z direction of the head of the bolt 85 is formed between itself and the one through hole 771, and an interval larger than the width dimension in the Z direction of the head of the bolt 85 is formed between itself and the other end in the Z direction of the one end portion.

Further, the pair of through holes 771 in the other end portion are formed at asymmetrical positions to each other with respect to the center line in the Z direction of the coupling member 75. That is, the one through hole 771 is formed on the other end side in the Z direction of the other end portion, and the other through hole 771 is formed at a position on one end side thereof that is closer to the center in the Z direction of the other end portion. More specifically, the one through hole 771 is arranged on the other end side in the Z direction of the other end portion, and the other through hole 771 is arranged in the other end portion so that an interval larger than the width dimension in the Z direction of the head of the bolt 85 is formed between itself and the one through hole 771, and an interval larger than the width dimension in the Z direction of the head of the bolt 85 is formed between itself and the one end in the Z direction of the other end portion.

Further, the pair of through holes 771 in the one end portion are formed at symmetrical positions to the pair of through holes 771 in the other end portion with respect to the center point in the Y direction and the Z direction of the coupling member 75.

The same two coupling members 75 are used as the pair of coupling members 75 in this embodiment. That is, in this embodiment, the same two coupling members 75 aligned in the same direction are used with one of the two coupling members 75 being turned over 180 degree (rotated about the Z axis) so that their inner surfaces face each other.

The cell monitoring circuit module 9 is a cell monitoring circuit (not shown) housed in a circuit case 90. The circuit case 90 includes a case body 91 having an opening, and a cover plate 92 configured to close and seal the opening of the case body 91.

The battery module 1 configured as above is accomplished as follows: the plurality of battery cells 3 are stacked with the spacers 5 interposed therebetween; the spacers 5 are also arranged laterally of the battery cells 3 respectively at one end and the other end; the pair of end members 70 are further arranged respectively on both sides thereof; while a compressive force in the X direction is applied between the pair of end members 70, the pair of coupling members 75 are arranged on the plurality of battery cells 3 in the Y direction, and the threaded portions of the bolts 85 inserted through the respective through holes 771 of the coupling members 75 are screwed into the internal threads 710 of the end members 70; and, after the plurality of battery cells 3 and the plurality of spacers 5 are integrated with the frame 7, the cell monitoring circuit module 9 is arranged on the plurality of battery cells 3 in the Z direction so as to be attached thereto.

Figure 6:
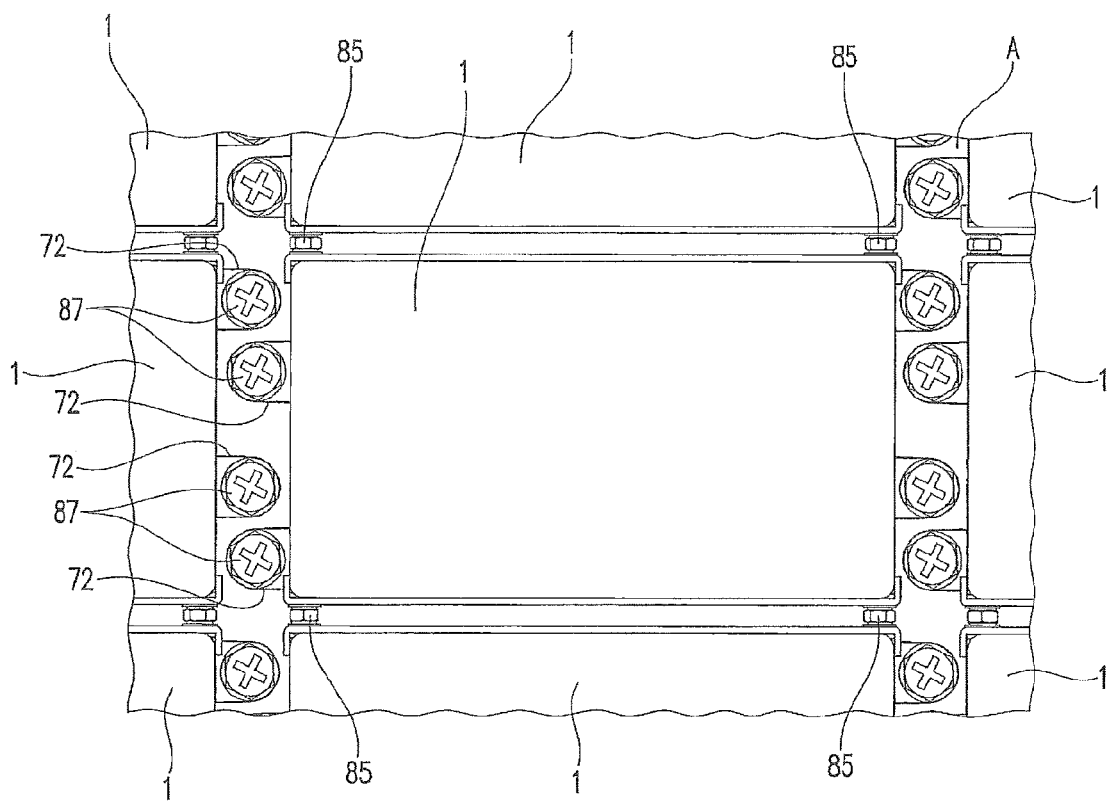
FIG. 6 is a partial plan view of a battery module unit according to an embodiment in which the same battery modules as above are aligned in the longitudinal and lateral directions on a base plate.

Meanwhile, the battery module 1 having the aforementioned configuration has the leg portions 72 of the end member 70 projecting as projecting portions. More specifically, the leg portions 72 of one end member 70 project on one side of the battery module 1 as first projecting portions, and the leg portions 72 of the other end member 70 project on the other side of the battery module 1 as second projecting portions. It should be noted that such a projecting portion means a portion protruding from the contour (outline) of the battery module 1 as seen from any one of the X direction, the Y direction, and the Z direction. However, as shown in FIG. 6, the leg portions 72 of one of adjacent battery modules 1 in the X direction are located at different positions in the Y direction from the leg portions 72 of the other of the battery modules 1. Accordingly, when at least two battery modules 1 are aligned in the X direction on the base plate A, their leg portions 72 do not interfere with each other. Therefore, adjacent battery modules 1 in the X direction can be arranged as close as possible. The threaded portions of the bolts 87 inserted through the through holes 720 of the leg portions 72 are screwed into internal threads (not shown) formed in the base plate A, thereby allowing the battery modules 1 to be fixed to the base plate A.

Further, the heads of the bolts 85 for fastening the coupling members 75 to the end members 70 project as projecting portions from the battery module 1 configured as above. More specifically, the heads of the bolts 85 for fastening one of the coupling members 75 to the end members 70 project on one side of the battery module 1 as first projecting portions, and the heads of the bolts 85 for fastening the other of the coupling members 75 to the end members 70 project on the opposite side of the one side of the battery module 1 as second projecting portions. However, the heads of the bolts 85 of one of adjacent battery modules 1 in the Y direction and the heads of the bolts 85 of the other of the battery modules 1 are located at different positions in the Z direction, as shown in FIG. 6. Accordingly, when at least two battery modules 1 are aligned in the Y direction on the base plate A, the heads of the bolts 85 do not interfere with each other. Therefore, adjacent the battery modules 1 in the Y direction can be arranged as closely as possible.

In this way, the battery modules 1 configured as above can be closely arranged in the both longitudinal and lateral directions on the base plate A. Therefore, it is possible to reduce the size of the battery module unit while increasing the electric storage capacity per unit volume.

Further, this embodiment also have an effect of uniformly cooling the battery modules 1 without unevenness, because the plurality of battery modules 1 can be closely arranged on the base plate A that is a cooling plate (heatsink) in which a cooling medium such as water circulates (via a pipe). More specifically, whereas the battery modules 1 need to be arranged on the base plate A in the water-cooling system, a plurality of battery modules 1 configured as above can be closely arranged thereon. Therefore, a larger number of battery modules 1 can be arranged even on the base plate A with the same area, as compared to the case where the battery modules 1 are arranged so that the leg portions 72 or the heads of the bolts 85 of adjacent battery modules 1 interfere with each other. Therefore, it is possible to mount a large number of battery modules 1 while suppressing an increase in cost of the base plate A.

It should be noted that the electric storage apparatus according to the present invention is not limited to the above-mentioned embodiments, and various modifications can be made without departing from the scope of the invention.

For example, the leg portions 72 are formed at different positions in the Y direction, in the above-mentioned embodiments. However, this is not restrictive. The leg portions 72 may be formed at different positions in the Z direction.

Further, the leg portions 72 project outwardly in the X direction, in the above-mentioned embodiments. However, this is not restrictive. The leg portions 72 may be configured to project outwardly in the Y direction. Alternatively, the leg portions 72 may be configured to project in both the X direction and the Y direction.

Further, the heads of the bolts 85 are formed at different positions in the Z direction, in the above-mentioned embodiments. However, this is not restrictive. The heads of the bolts 85 may be formed at different positions in the X direction.

Further, in the above-mentioned embodiments, the bolts 85 are threadedly engaged in the Y direction, and therefore the heads of the bolts 85 project outwardly in the Y direction. However, this is not restrictive. The bolts 85 may be threadedly engaged in the X direction, so that the heads of the bolts 85 project outwardly in the X direction. Alternatively, the heads of the bolts 85 may be configured to project in both the Y direction and the X direction.

Further, a pair of coupling members 75 are arranged respectively on the left and right lateral sides of a pair of end members 70, in the above-mentioned embodiments. However, this is not restrictive. The pair of coupling members may be arranged respectively at the top and bottom of the pair of end members 70. Further, the coupling members 75 each may be in the form of a strip plate, not in the form of a frame. In such a case, a pair of through holes 771 in one end portion of the coupling member 75 and a pair of through holes 771 in the other end portion thereof are formed at symmetrical positions to each other with respect to the center point of the coupling member 75 in the X direction and the Y direction.

Further, in the above-mentioned embodiments, two leg portions 72 are provided on one surface in the X direction of the battery module 1, and the heads of four bolts 85 are provided on one surface in the Y direction of the battery module 1. However, this is not restrictive. The number of leg portions 72 may be one, or may be three or more. The number of bolts 85 may be two or three, or may be five or more.

Further, in the above-mentioned embodiments, the leg portions 72 are provided in the same number on each of one side and the other side of the battery module 1, and the heads of the bolts 85 are also provided in the same number on each of one side and the other side of the battery module 1. However, this is not restrictive. The number of projecting portions (first projecting portions) on one side of the battery module 1 and the number of projecting portions (second projecting portions) on the other side thereof are not necessarily the same, such as that one leg portion 72 is provided on one side of the battery module 1, and two leg portions 72 are provided on the other side thereof.

Further, in the above-mentioned embodiments, the bolts 85 serve as projecting portions as a result of fastening the members to each other. However, this is not restrictive. Other fastening members such as rivets and anchors may serve as projecting portions.

Further, in the above-mentioned embodiments, the frame 7 including a pair of end members 70 and a pair of coupling members 75 is used as a holding member, so that the stacked battery cells 3 are tightened together and retained by the frame 7. However, this is not restrictive. The holding member, for example, may be a housing in the form of a case (in the form of a box) that houses a plurality of battery cells 3 that are closely arranged or arranged with some gaps therebetween.

Further, the water-cooling system is employed in the above-mentioned embodiments. However, this is not restrictive. A so-called air-cooling system may be employed, in which the battery cells 3 are cooled by the air circulating through gaps formed between the battery cells 3.

Further, in the above-mentioned embodiments, the same two end members 70 are used in this embodiment as the pair of end members 70, and the same two coupling members 75 are used as the pair of coupling members 75. However, this is not restrictive. One of the end members 70 and the other of the end members 70 are not necessarily the same (with the same configuration). Further, one of the coupling members 75 and the other of the coupling members 75 are not necessarily the same (with the same configuration). Particularly, a structure in which no projecting portions project on the outermost circumference of a battery module unit is made possible, for example, by using end members having no projecting portions (leg portions) as the lateral end members 70 of the battery modules 1 that are located respectively at both ends in the battery module unit. This allows the peripheral walls of the battery module unit to offset toward the center, thereby reducing the size of the battery module unit.

Figure 7:
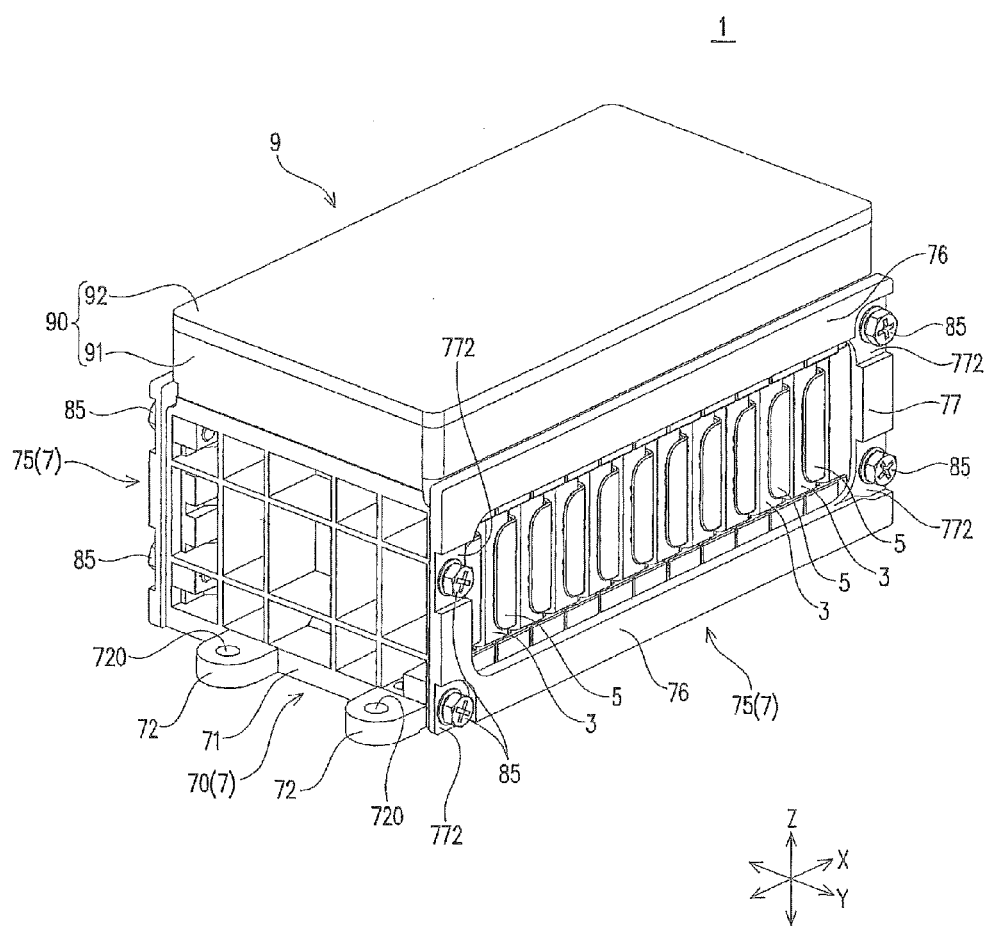
FIG. 7 is a perspective view of a battery module according to another embodiment.

Further, the coupling members 75 used in the above-mentioned embodiments each have the folded parts 770 formed by folding both ends of the plate material with a rectangular frame shape. However, this is not restrictive. For example, as shown in FIG. 7, a plate material (steel plate) of a rectangular frame shape having a certain thickness (for example, about 6 mm) may be used as the coupling member 75. In such a case, the through holes 771 for allowing the threaded portions of the bolts 85 to pass therethrough may be formed on the plate material as they are; however, in order to closely arrange a plurality of the battery modules 1, the through holes 771 are preferably formed on a plate material having recessed portions (step portions) 772 with the through holes 771 formed therein, so that the heads of the bolts 85 are embedded therein. In such a case, the heads of the bolts 85 slightly project from the outer surface of the plate material.

Further, lithium ion secondary battery cells are described in the above embodiment. However, the types and size (capacity) of the battery cells are arbitrarily selected.

Further, the present invention is not limited to such a lithium ion secondary battery cell. The present invention can be applied to various secondary battery cells, and further to primary battery cells or capacitors such as an electric double layer capacitor.

What is claimed is:

1. An electric storage apparatus, comprising:
a plurality of electric storage devices; and
a frame that includes a pair of end members and coupling members, the end members being arranged on a first side of the electric storage devices and a second side of the electric devices located opposite to the first side of the electric storage devices, the coupling members coupling the end members,
wherein the end members include a first projecting portion projecting from a bottom surface of one of the end members on the first side of the electric storage devices and a second projecting portion projecting from a bottom surface of another one of the end members on the second side of the electric storage devices, and
wherein the first projecting portion and the second projecting portion are formed at different positions from each other in a direction orthogonal to a direction in which the first and second projecting portions project along an arrangement direction of the electric storage devices.

2. The electric storage apparatus according to claim 1, wherein
the pair of end members includes same two members, with the one of the end members and the another one of the end members having an inverse relationship to each other.

3. The electric storage apparatus according to claim 1, wherein the projecting portions include leg portions of the holding members.

4. The electric storage apparatus according to claim 1, wherein the holding members include a plurality of members, and
wherein the projecting portions include parts of fastening members configured to fasten the members of the holding members to each other.

5. The electric storage apparatus according to claim 1, further comprising:
a cooling plate, on which the electric storage apparatus is mounted, configured to cool the electric storage devices by being in contact with the electric storage apparatus.

6. The electric storage apparatus according to claim 1, wherein the first projecting portion is an integral part of said one of the end members.

7. The electric storage apparatus according to claim 1, further comprising:
a base plate configured to be fastened to the first projection portion and the second projection portion.

8. The electric storage apparatus according to claim 7, wherein the base plate is configured to be fastened to the first projection portion and the second projection portion in a direction orthogonal to the direction orthogonal to the direction in which the first and second projecting portions project and orthogonal to the arrangement direction of the electric storage devices.

9. The electric storage apparatus according to claim 1, further comprising:
a water-cooling system comprising circulating water and a cooling plate configured to cool the electric storage devices by being in contact with the electric storage apparatus.

10. The electric storage apparatus according to claim 1, further comprising:
a cell monitoring circuit module arranged on top surfaces of the plurality of electric storage devices.

11. The electric storage apparatus according to claim 1, wherein the end members further include a third projecting portion projecting from the bottom surface of said one of the end members on the first side of the electric storage devices, and
wherein the first projecting portion and the third projecting portion are located at asymmetrical positions to each other with respect to a center line of said one of the end members in the direction orthogonal to the direction in which the first and second projecting portions project along the arrangement direction of the electric storage devices.

12. The electric storage apparatus according to claim 1, wherein the end members further include a third projecting portion projecting from the bottom surface of said one of the end members on the first side of the electric storage devices, and
wherein, in the direction orthogonal to the direction in which the first and second projecting portions project along the arrangement direction of the electric storage devices, a distance between first projecting portion and a center line of said one of the end members is less than a distance between the third projecting portion and the center line of said one of the end members.

13. An electric storage apparatus unit, comprising:
at least two aligned electric storage apparatuses each including:
a plurality of electric storage devices; and
a frame that includes a pair of end members and coupling members, the end members being arranged on a first side of said each electric storage apparatus and a second side of said each electric storage apparatus located opposite to the first side of said each electric storage apparatus, the coupling members coupling the end members,
wherein the end members of each of adjacent electric storage apparatuses include a projecting portion projecting, between the adjacent electric storage apparatuses, from a bottom surface of the end members along an arrangement direction of the electric storage devices in said each electric storage apparatuses, and
wherein the projecting portion of the holding members of one of the adjacent electric storage apparatuses and the projecting portion of the holding members of an other of the adjacent electric storage apparatuses are formed at different positions in a direction orthogonal to a direction in which the adjacent electric storage apparatuses are aligned.

14. The electric storage apparatus unit according to claim 13, wherein the projecting portion of the holding members of said one of the adjacent electric storage apparatuses is an integral part of the end members of said one of the adjacent electric storage apparatuses.

15. The electric storage apparatus unit according to claim 13, further comprising:
a base plate configured to be fastened to the projection portion of the holding members of said one of the adjacent electric storage apparatuses and to the projection portion of the holding members of said other of the adjacent electric storage apparatuses.

16. The electric storage apparatus unit according to claim 15, wherein the base plate is configured to be fastened to the projection portion of the holding members of said one of the adjacent electric storage apparatuses in a direction orthogonal to the direction orthogonal to the direction in which the adjacent electric storage apparatuses are aligned.

17. The electric storage apparatus unit according to claim 13, further comprising:
   a water-cooling system comprising circulating water and a cooling plate configured to cool the electric storage apparatus unit by being in contact with the electric storage apparatuses.

18. The electric storage apparatus unit according to claim 13, further comprising:
   a cell monitoring circuit module arranged on top surfaces of the electric storage apparatuses.

19. The electric storage apparatus unit according to claim 13, wherein the end members of each of adjacent electric storage apparatuses further include another projecting portion projecting, between the adjacent electric storage apparatuses, from the bottom surface of the end members along the arrangement direction of the electric storage devices in said each electric storage apparatuses.

20. The electric storage apparatus unit according to claim 19, wherein the projecting portion and said another projecting portion of the end members of each of adjacent electric storage apparatuses are formed at asymmetrical positions to each other with respect to a center line of the end members of each of adjacent electric storage apparatuses in the direction orthogonal to the direction in which the adjacent electric storage apparatuses are aligned.

* * * * *